United States Patent [19]

Kuzay

[11] Patent Number: 5,123,982
[45] Date of Patent: Jun. 23, 1992

[54] PROCESS OF MAKING CRYOGENICALLY COOLED HIGH THERMAL PERFORMANCE CRYSTAL OPTICS

[75] Inventor: Tuncer M. Kuzay, Naperville, Ill.

[73] Assignee: The United States of American as represented by the United States Department of Energy, Washington, D.C.

[21] Appl. No.: 547,753

[22] Filed: Jun. 29, 1990

[51] Int. Cl.⁵ ............................................. B32B 31/18
[52] U.S. Cl. ............................ 156/89; 165/104.26; 165/907; 165/80.1
[58] Field of Search ............... 156/89, 155; 62/51.1, 62/51.2; 165/907, 168, 80.1, 80.2, 104.26

[56] References Cited

U.S. PATENT DOCUMENTS 4,956,037  9/1990  Vivaldi .................................. 156/89

Primary Examiner—David A. Simmons
Assistant Examiner—Robert Barker
Attorney, Agent, or Firm—Helen S. Cordell; John M. Albrecht; William R. Moser

[57] ABSTRACT

A method for constructing a cooled optic wherein one or more cavities are milled, drilled or formed using casting or ultrasound laser machining techniques in a single crystal base and filled with porous material having high thermal conductivity at cryogenic temperatures. A non-machined strain-free single crystal can be bonded to the base to produce superior optics. During operation of the cooled optic, $N_2$ is pumped through the porous material at a sub-cooled cryogenic inlet temperature and with sufficient system pressure to prevent the fluid bulk temperature from reaching saturation.

12 Claims, 4 Drawing Sheets

PROCESS OF MAKING CRYOGENICALLY COOLED HIGH THERMAL PERFORMANCE CRYSTAL OPTICS

CONTRACTUAL ORIGIN OF THE INVENTION

The United States Government has rights in this invention pursuant to Contract No. W-31-109-ENG-38 between the U.S. Department of Energy and the University of Chicago.

BACKGROUND OF THE INVENTION

Crystal elements are used as mirrors in high-energy lasers, space technology and synchrotrons. In these applications, intense thermal energy (up to 100 kilowatts) is produced that creates bumps in the surface of the mirror, limiting instrument performance. This optical distortion can be lessened by improving heat transfer and/or lowering coolant temperature and using materials that perform well at low temperatures. The best results are obtained by applying both techniques.

Current designs use water-cooled micro-channels or etched channel wafers bonded together to create multistack, multi-hole geometries for the optical substrates. The working surface is either bonded to the substrate or created separately by one of several deposition techniques. But as the coolant is pumped through the cooling channels at very high velocities for high heat transfer, it causes "jitters". Although vibration is undesirable, the resulting level of mirror performance is adequate for many applications. However, where very critical optical distortion tolerances are involved (less than 3 Å/W/cm$^2$), water cooling is not satisfactory.

Ammonia and other cryogen coolants have been suggested, but the geometries of prior art optics do not support the low boiling heat flux of these coolants in the preferred single-phase mode.

It is therefore a primary object of this invention to provide a method for constructing and operating a cooled optic which optimizes performance by exploiting a coolant which remains single phase and has superior heat transfer capacity at operating temperatures.

In the accomplishment of the foregoing object, it is another important object of this invention to provide a method for constructing a cooled optic which maximizes heat transfer area by incorporating porous materials with unusually high thermal conductivities.

It is a further object of this invention to present a method for constructing a cooled optic which is inexpensive, requiring limited machining and using commercially available components.

It is another important object of this invention to provide a method for operating a cooled optic which results in very small temperature differentials and hence negligible thermal stresses and optical distortion of the crystal.

A yet further object of the present invention is to present a method for operating a cooled optic which is predictable, stable, and vibration free, while meeting high optical performance requirements.

Additional objects, advantages and novel features of the invention will become apparent to those skilled in the art upon examination of the following and by practice of the invention.

SUMMARY OF THE INVENTION

To achieve the foregoing and other objects, this invention comprises a method for constructing a cooled optic wherein one or more cavities are milled, drilled or formed using casting or ultrasound laser machining techniques in a base crystal and filled with a porous material having high thermal conductivity at cryogenic temperatures. The invention further provides that during operation of the cooled optic, $N_2$ is pumped through the porous material at a sub-cooled cryogenic inlet temperature and with sufficient system pressure to prevent the fluid bulk temperature from reaching saturation.

BRIEF DESCRIPTION OF THE DRAWINGS

The present invention is illustrated in the accompanying drawings where.

DETAILED DESCRIPTION OF THE INVENTION

Figure 1:
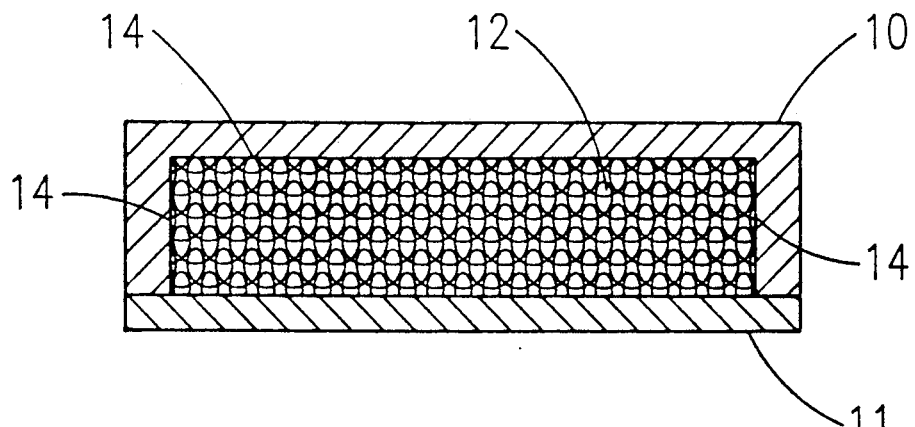
FIG. 1 is a cross-sectional view of a cooled optic after removing the core and filling the cavity with a porous material.
Figure 2:
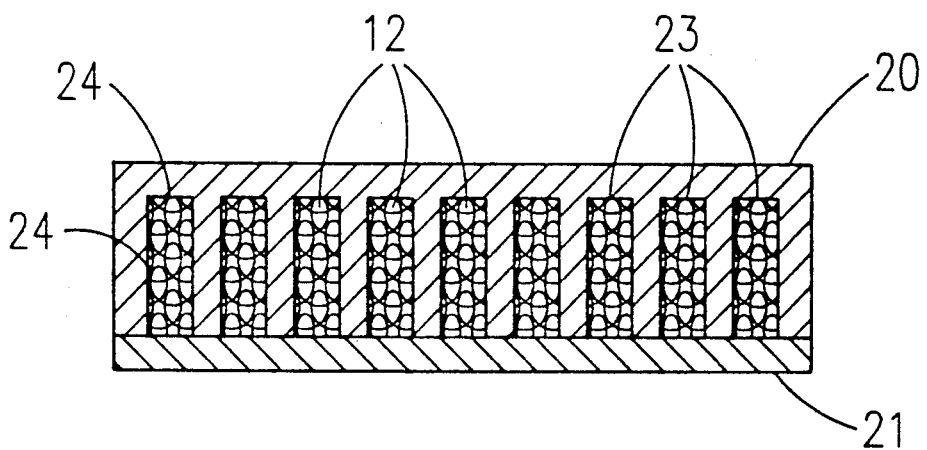
FIG. 2 is a cross-sectional view of a cooled optic after milling channels and filling the cavities with a porous material.
Figure 3:
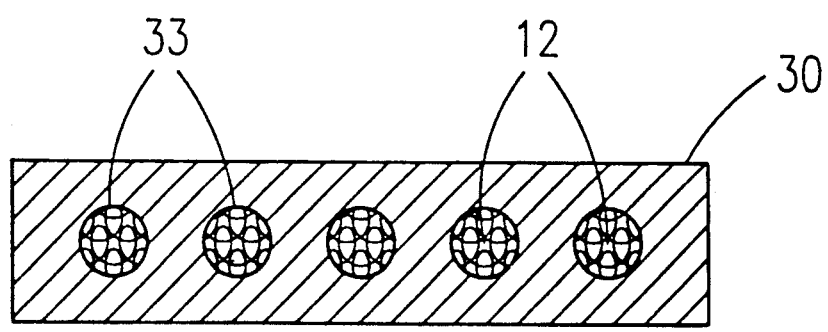
FIG. 3 is a cross-sectional view of a cooled optic after drilling holes and filling the cavities with a porous material.

FIGS. 1, 2 and 3 are cross-sectional views of cooled optics constructed using the present invention. In FIG. 1, optics body 10 is milled to remove its core. The resulting cavity is filled with a porous material 12 which is then bonded or fused at interfaces 14 to optics body 10. Strain-free single crystal working surface 11 is then bonded to optics body 10, covering the filled core. Working surface 11 may also be bonded to porous material 12.

In FIG. 2, three-sided channels 23 are milled in optics body 20 and filled with porous material 12. Material 12 is bonded at interfaces 24 to optics body 20. Working surface 21 is bonded to optics body 20, covering channels 23. This structure is mechanically stronger than that of FIG. 1 because of the presence of the fused solid crystal ribbing. In operation, if high operational pressures are required the geometry in FIG. 2 might be preferred for structural strength.

In FIG. 3, holes 33 are drilled in optics body 30, and filled with porous material 12. Material 12 is bonded to interfaces with holes 33. Or, as an alternate, material 12 may be pressed or shrunk-fit into channels 23 of FIG. 2 or holes 33 of FIG. 3. Pressure contacts will be sufficient in applications involving cryogenic temperatures, because there will be little thermal expansion to deteriorate heat transfer across the contact interfaces.

Optics bodies 10, 20, and 30 are single crystals of pre-chosen orientation, such as (111), (112) or (222). Single crystal silicon is generally preferred among materials for high energy optics because of its optical qualities combined with its low thermal expansion coefficient (α) and high thermal conductivity (k). In the preferred embodiment of this invention, silicon carbide is utilized for optics bodies 10 and 20, and silicon for optics body 30, because they possess especially beneficial thermal expansion characteristics at cryogenic temperatures. Silicon carbide in the range of temperature from 0 K. to 150 K. has a negligibly small thermal expansion coefficient, and at 30 K. and 120 K. the coefficient is 0. Silicon and silicon carbide are a natural match in such composite/bonded crystal designs.

In addition, the thermal conductivity (k) of silicon at cryogenic temperatures is significantly improved when compared to k at room temperature. For example, at 80 K., k=15 W (cm K)$^{-1}$, whereas at 300 K., k=1.5 W (cm K)$^{-1}$, an improvement of almost ten fold. This means that at cryogenic temperatures, surface and/or body heating resulting from irradiation will be transported rapidly and uniformly to a coolant, even through relatively thick crystals.

Porous material 12 is one of several specially selected sponge or foam materials also having large thermal conductivities at cryogenic temperatures, including beryllium (Be), silicon (Si), silicon carbide (SiC), and beryllium oxide (beryllia). Each of these materials possesses large thermal conductivity at cryogenic temperatures. For example, at 80 K. the thermal conductivity of pure silicon carbide can be as large as 55 W (cm K)$^{-1}$, and of beryllium about 15 W (cm K)$^{-1}$, or, respectively, almost four times and the same as that of silicon. Recently developed pure beryllium metals exhibit thermal conductivities several fold better than the conventional beryllium.

Each of these special materials is available from various U.S. manufacturers in the form of sintered powder, or sponge or foam to any desired pore specifications, having very large surface area per unit volume, and high porosity to cause small pressure drops. Cells are nearly uniform in diameter and wall thickness, providing intrinsically balanced flow distribution channels. Alternatively, foams may be tailored to preset unequal flow distribution from channel to channel to match the heat flux profiles impinging on the optics. In addition, each of these materials is compatible with $N_2$, fusible to each other, and non-brittle and nongranulated under flow. In alternate embodiments, meshed or pressed wire or sintered woven cloth may be used in less demanding optical applications.

With presently known deposition techniques, single crystals cannot be deposited on foam-like substrates as single crystals. Therefore, as depicted in FIGS. 1 and 2, single-crystal working surfaces 11 and 21, respectively, must be bonded to the base heat exchanger or optics bodies 10 and 20, respectively, or, as in FIG. 3, the single crystal optics body 30 must be machined to make the heat exchanger.

Figure 4:
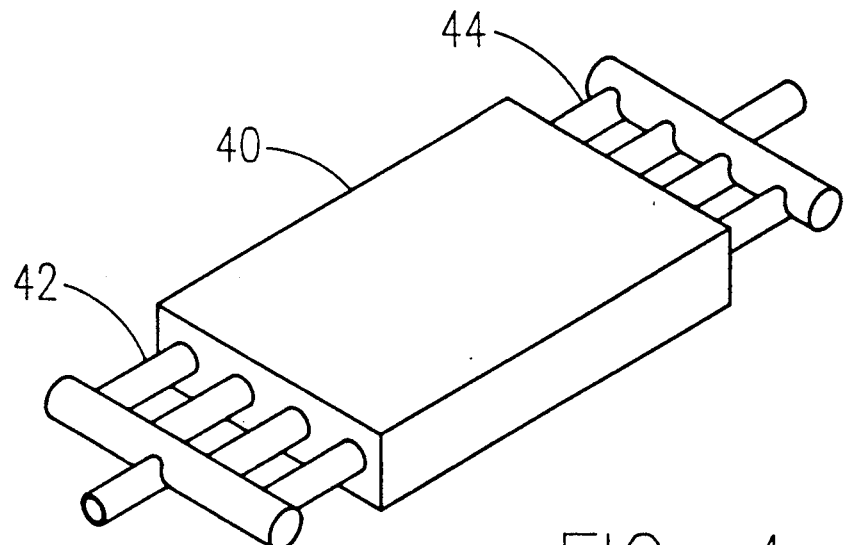
FIG. 4 is a schematic of a prior art crystal showing inlet and outlet ports.

FIG. 4 is a schematic of a prior art crystal in a typical configuration showing inlet and outlet ports. Inlet manifold 42 and outlet manifold 44 are made of low thermal expansion materials such as Invar steel and are fastened to crystal 40.

Figure 5:
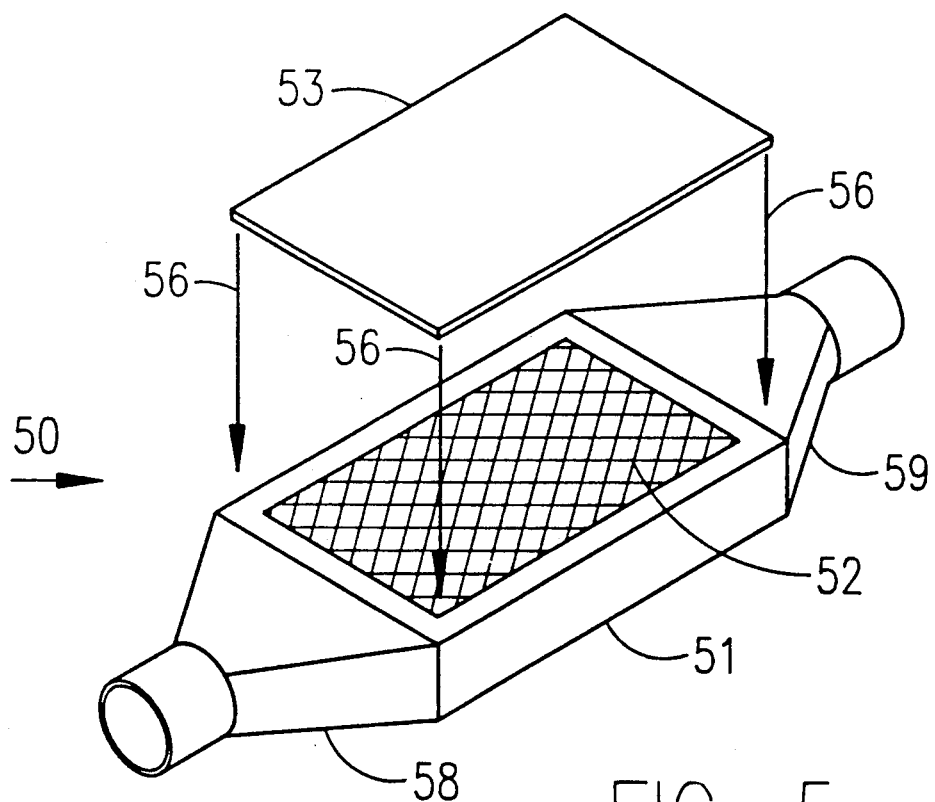
FIG. 5 is a schematic of a cooled optic of the present invention, showing inlet and outlet as integral parts of the substrate.

FIG. 5 is a schematic of a cooled optic of the present invention, showing inlet and outlet ports as integral parts of the substrate. Optics 50 is comprised of substrate 51, porous material 52 and crystal 53. In the embodiment depicted in FIG. 5, substrate 51 is made of SiC or Be and has been formed or machined to remove its core; the resulting cavity is filled with porous material 52, such as SiC, beryllia, or beryllium foam. Crystal 53 is an Si (111) plate and is affixed by bonding as indicated by arrows 56 to substrate 51. Inlet 58 and outlet 59 are integral to substrate 51, having been cast or molded from the SiC or Be crystal which forms substrate 51.

Figure 6:
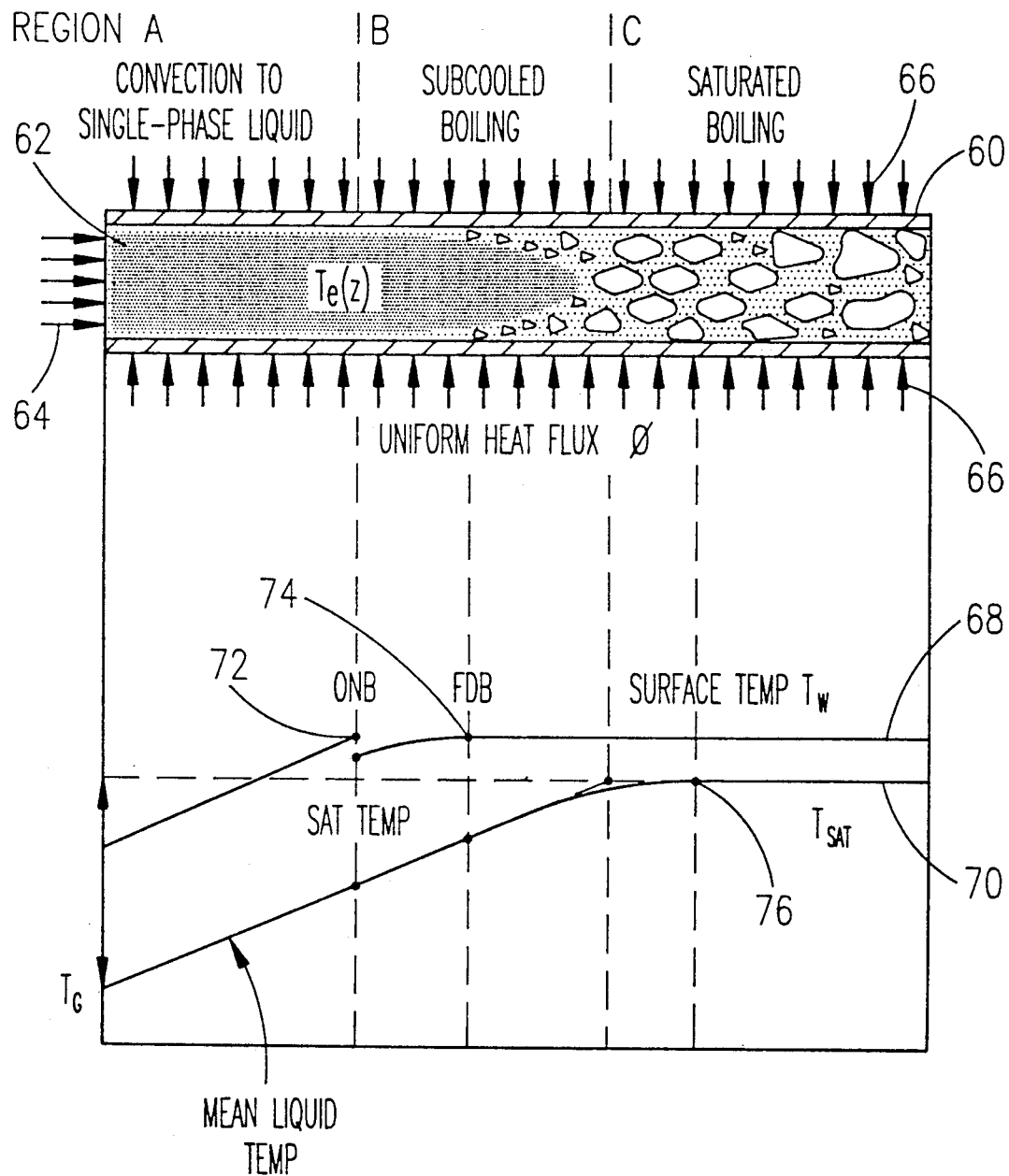
FIG. 6 is a schematic illustrating convective boiling heat transfer phenomenon for a single channel under uniform heat load.

A method for cooling of the above described optics builds on principles well understood in the prior art. (Cf. Collier, *Convective Boiling and Condensation*, pp. 139-172, 1972.) FIG. 6 is a schematic illustrating convective boiling heat transfer phenomenon, using water as a coolant in a single channel under uniform heat load. As depicted in FIG. 6, coolant 62 enters a single channel 60 as a single-phase liquid in Region A and flows in the direction of arrows 64. Channel 60 is under uniform heat load in the direction of arrows 66, causing the surface temperature $T_H$ of channel 60 to rise as depicted in line graph 68 through the onset of boiling 72, and through the point of fully developed boiling 74. The mean liquid temperature of coolant 62, depicted in line graph 70, also rises consistently until the coolant 62 reaches saturation temperature at 76.

As is depicted in Region B of channel 60, after coolant 62 reaches onset of boiling 72——when the mean liquid temperature is at or slightly above saturation temperature——a change from the liquid to the vapor state occurs locally. Bubbles occur in the liquid or attached to the heated surface, but condense quickly in the main stream, giving up their latent heat to raise the temperature of coolant 62. This condition is known as subcooled boiling and is characterized by very high heat transfer coefficients.

In Region C of channel 60 the water is two-phase and the formation of bubbles begins to interfere with the flow of water and, as shown by line graph 68, without effect on surface temperature. If coolant 62 is water in a cooled optic, cooling performance may be improved to a degree by pressurizing the system or using high coolant flow rates. However, these methods may detract from overall optical system performance by aggravating pressure distortions or coolant flow-induced vibration problems. Further, these conventional methods have not proven to be sufficient to obtain critical optical distortion tolerances less than 3 Å $(W/cm^2)^{-1}$ without the use at cryogenic temperatures of the select materials of the present invention.

Figure 7:
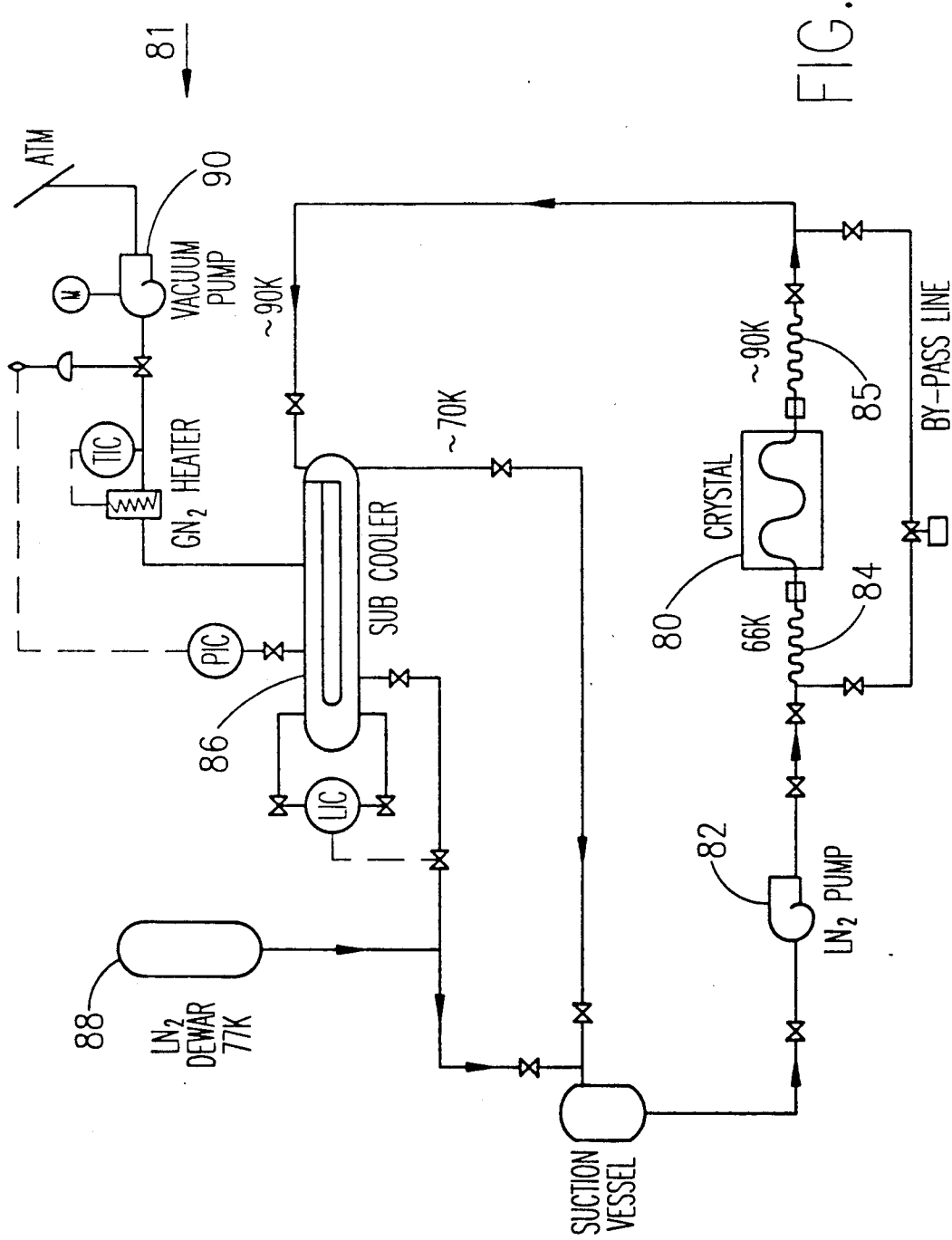
FIG. 7 is a schematic of a closed loop $LN_2$ system for cooling of an optic.

The method for operating a cooled optic of the present invention avoids interference caused by two-phase flow by maintaining the coolant in a single phase mode and/or partially in a benign subcooled convective boiling mode using a closed sample loop $LN_2$ system as depicted in FIG. 7.

In FIG. 7, a closed loop system is comprised of dewar 88, subcooler 86, crystal 80 and $LN_2$ pump 82. Dewar 88 charges the closed loop with $LN_2$. $LN_2$ is vacuum subcooled by subcooler 86 using vacuum pump system 90. Centrifugal pump 82 circulates subcooled $LN_2$ through the system at a design flow rate of 10 GPM, or an operating flow rate of 5 GPM, and up to 10 atmosphere system pressure.

For example, a 10 KW heat load increases the temperature of the 5 GPM flow from about 70 K. to 89 K. However, the mean liquid temperature is maintained below saturation temperature, avoiding the change from the liquid to the vapor state, by operating at higher pressures and subcooling the $LN_2$ at the entrance to the crystal. In the preferred embodiment, the operating pressure is set to a practicable 7 ATM (103 psi), for which the saturation temperature of the liquid is 96 K. In addition, $LN_2$ at the entrance to crystal 80 has been subcooled to 66 K. The critical temperature and pressure of $LN_2$ being 126.16 K. and 33.4 atmosphere respectively, the design of the operating conditions in this case will allow at least 11 K. subcooling of the liquid at the crystal exit to assure sub-cooled boiling where such operating conditions are preferred. Under conditions where subcooled boiling is not a primary requirement regular two-phase boiling may be applied.

Thus, the present invention takes advantage of the enhanced heat transfer and special properties of select materials at low temperatures and combines them with cryogenic cooling in single or two phase mode to achieve high levels of optics performance even in high heat cases. Construction of the cooled optic is inexpensive, requiring limited machining and using commercially available components. A non-machined strain-free single crystal can be bonded to machined parts to produce superior optics. The preferred coolant is stable and safe under necessary temperature differentials, and operation of the cooled optic is predictable, and free of "jitters".

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. A method for constructing a cooled optic including:
   creating a cavity in an optics body,
   filling said cavity in said optics body with porous material having high thermal conductivity at cryogenic temperatures,
   bonding said porous material to said optics body, and
   bonding a strain-free single crystal coverplate to said optics body, covering said filled cavity.

2. The method of claim 1 wherein said cavity is created by removing the core of said optics body.

3. The method of claim 1 wherein said cavity is created by milling slots in said optics body.

4. The method of claim 1 wherein said cavity is created by drilling holes in said optics body.

5. The method of claim 1 wherein said optics body is a member of the group including silicon, silicon carbide, beryllium, and beryllium oxide.

6. The method of claim 1 wherein said porous material is a member of the group including silicon, silicon carbide, beryllium, and beryllium oxide.

7. The method of claim 6 wherein said porous material is sintered powder.

8. The method of claim 6 wherein said porous material is mechanically pressed into said cavity.

9. The method of claim 6 wherein said porous material is shrunk-fit into said cavity.

10. The method of claim 1 wherein said porous material is sintered woven cloth.

11. The method of claim 1 including bonding said porous material to said crystal coverplate.

12. The method of claim 1 including molding inlet and outlet ports as integral parts of said base crystal.

* * * * *